United States Patent
Ahn et al.

(10) Patent No.: US 8,680,002 B2
(45) Date of Patent: Mar. 25, 2014

(54) DOUBLE METAL CYANIDE CATALYST HAVING A CONTROLLED REACTIVITY FOR PREPARING A POLYOL AND PREPARATION THEREOF

(75) Inventors: Jun Tae Ahn, Seoul (KR); Sang Hyun Lee, Ulsan (KR); Young Chan Jeon, Ulsan (KR); Sang Wook Park, Ulsan (KR); Chang Ha Park, Ulsan (KR); In Ha Park, Gwacheon-si (KR)

(73) Assignee: SKC Co., Ltd., Suwon-Si (KR)

( * ) Notice: Subject to any disclaimer, the term of this patent is extended or adjusted under 35 U.S.C. 154(b) by 451 days.

(21) Appl. No.: 12/993,415

(22) PCT Filed: Nov. 4, 2008

(86) PCT No.: PCT/KR2008/006489
§ 371 (c)(1),
(2), (4) Date: Nov. 18, 2010

(87) PCT Pub. No.: WO2009/142370
PCT Pub. Date: Nov. 26, 2009

(65) Prior Publication Data
US 2011/0077419 A1   Mar. 31, 2011

(30) Foreign Application Priority Data
May 21, 2008   (KR) .................. 10-2008-0047031

(51) Int. Cl.
*B01J 31/00* (2006.01)

(52) U.S. Cl.
USPC ............ 502/154; 502/175; 556/128; 568/620

(58) Field of Classification Search
None
See application file for complete search history.

(56) References Cited

U.S. PATENT DOCUMENTS

| | | | |
|---|---|---|---|
| 3,821,505 A | 6/1974 | Wood | |
| 4,477,589 A * | 10/1984 | van der Hulst et al. | 502/169 |
| 4,721,818 A * | 1/1988 | Harper et al. | 568/620 |
| 4,877,906 A * | 10/1989 | Harper | 568/621 |
| 5,158,922 A | 10/1992 | Hinney et al. | |
| 5,470,813 A * | 11/1995 | Le-Khac | 502/175 |
| 5,482,908 A | 1/1996 | Le-Khac | |
| 5,545,601 A * | 8/1996 | Le-Khac | 502/156 |
| 5,627,120 A * | 5/1997 | Le-Khac | 502/156 |
| 5,780,584 A | 7/1998 | Le-Khac et al. | |
| 5,789,626 A * | 8/1998 | Le-Khac | 568/620 |
| 6,627,575 B2 | 9/2003 | Kim et al. | |
| 6,852,663 B2 | 2/2005 | Ooms et al. | |
| 6,919,293 B1 | 7/2005 | Ooms et al. | |
| 6,953,765 B2 | 10/2005 | Ooms et al. | |
| 7,101,823 B2 * | 9/2006 | Wehmeyer | 502/159 |
| 2006/0004233 A1 * | 1/2006 | Suzuki et al. | 568/679 |

FOREIGN PATENT DOCUMENTS

| | | |
|---|---|---|
| CN | 1303402 A | 7/2001 |
| KR | 10-2002-0080824 A | 10/2002 |
| KR | 10-2002-0085806 A | 11/2002 |
| WO | 99/51661 A1 | 10/1999 |

OTHER PUBLICATIONS

Kim, I., et al. "Polymerization of propylene oxide by using double metal cyanide catalysts and the application to polyurethane elastomer," Polymer (2003) 44: 3417-3428.*
Chinese Patent Office, Chinese Office Action issued in corresponding CN Application No. 200880129386.9, dated Jun. 27, 2012.

* cited by examiner

*Primary Examiner* — Sudhakar Katakam
(74) *Attorney, Agent, or Firm* — Sughrue Mion, PLLC

(57) ABSTRACT

A double metal cyanide catalyst of the present invention having a controlled reactivity for preparing a polyol, which contains an ether ligand having a molecular weight of less than 200 and a glycol ligand having a molecular weight of less than 200 can be used in the preparation of a polyol having a unsaturation degree suitable for direct use for producing a polyurethane having suitable properties.

9 Claims, No Drawings

DOUBLE METAL CYANIDE CATALYST HAVING A CONTROLLED REACTIVITY FOR PREPARING A POLYOL AND PREPARATION THEREOF

FIELD OF THE INVENTION

The present invention relates to a double metal cyanide catalyst which has a controlled reactivity and provides a polyol having an intended unsaturation degree, and a method for preparing same.

BACKGROUND OF THE INVENTION

Polyols are used in the preparation of polyurethanes which are widely used in the manufacture of automotive interior parts, furniture, elastomers, coatings, and others. A flexible polyurethane is prepared using a polyol having a relatively high molecular weight of 3,000 to 6,000, and a rigid polyurethane, using a polyol having a relatively low molecular weight of 150 to 1,000. Also, for the manufacture of a polyurethane slab, a polyol produced by random copolymerization using propylene oxide (PO) and ethylene oxide (EO) is commonly used.

The preparation of a polyol is generally conducted by the polymerization of one or more hydrocarbon epoxides in the presence of a polymerizing initiator and an alkaline catalyst such as KOH. During the epoxide polymerization, undesirable unsaturated polyols are produced through side reactions. Such a unsaturated polyol containing a carbon-carbon double bond and one hydroxyl group tends not to form a 3-dimensional net structure when polymerized with isocyanate, leading to poor physical properties, particularly unsatisfactory elasticity of the resulting polyurethane product. Also, the KOH catalyst used in the preparation of a polyol must be separated from the polyol product by filtering under a reduced pressure. Thus, the conventional procedure is hampered by poor productivity.

Accordingly, in order to reduce the amount of the unsaturated polyols generated during the conventional polyol synthesis, a double metal cyanide (DMC) catalyst has been used in place of the KOH catalyst. The DMC catalyst makes it possible to minimize the content of the unsaturated polyol in the polyol product (the degree of unsaturation) to a level of about 0.005 meq/g. Such DMC catalysts are used in the preparation of a variety of polymers, including polyether, polyester and polyetherester.

A DMC catalyst is conventionally prepared from a mixture of a metal salt, a metal cyanide salt and a complexing agent, and it can be represented by $M_a[M'(CN)_6]_b L_c L'_d$, wherein M and M' are metal elements; L and L' are complexing agents; and a, b, c and d are integers, the sum of a, b, c and d being equal to the sum of the charges of M and M'.

The complexing agent contained in the DMC is to enhance the activity of the catalyst, and a preferred complexing agent is ethylene glycol, dimethyl ether, alcohol, aldehyde, ketone, ether, ester, amide, urea or nitrile. For example, U.S. Pat. Nos. 4,477,589, 3,821,505 and 5,158,922 disclose ethylene glycol or dimethyl ether as a complexing agent; U.S. Pat. No. 5,158,922, alcohols, aldehydes, ketones, ethers, esters, amides, urea and nitriles; U.S. Pat. No. 5,780,584, tert-butyl alcohol; and U.S. Pat. Nos. 5,482,908 and 5,789,626, a polyether.

A polyol produced using a highly active DMC catalyst has a very low content of unsaturated polyols of about 0.005 meq/g, but such a polyol has properties greatly different with those of the polyol having an unsaturation degree of 0.03 meq/g used widely in the art, which necessitates the significant modification of the conventional polyurethane manufacturing process. Also, the highly active DMC catalyst is excessively reactive, which makes it difficult to control the reaction temperature because it induces a sudden exothermic reaction.

SUMMARY OF THE INVENTION

Accordingly, it is an object of the present invention to provide an improved double metal cyanide catalyst which can be used in preparing a polyol having a suitable unsaturation degree suitable for producing a polyurethane having good properties, said catalyst having a controlled reactivity to prevent an initial and sudden exothermic reaction, and a method for preparing same.

In accordance with an aspect of the present invention, there is provided a double metal cyanide catalyst of formula (I):

$$M_a[M'(CN)_6]_b L_c L'_d \qquad (I)$$

wherein,

M is a metal element selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III);

M' is a metal element selected from the group consisting of Fe(II), Fe(III), Co(II), Co(III), Cr(II), Cr(III), Mn(II), Mn(III), Ir(III), Ni(II), Rh(III), Ru(II), V(V) and V(IV);

L is an ether having a molecular weight of less than 200;

L' is a mixture of an ether having a molecular weight of less than 200 and a glycol having a molecular weight of less than 200; and a, b, c and d are each independently an integer, the sum of which is equal to the sum of the charges of M and M'.

In accordance with another aspect of the present invention, there is provided a method for preparing said double metal cyanide catalyst of formula (I), which comprises:

(1) mixing an aqueous metal (M) salt solution, an aqueous metal (M') cyanide solution, and an ether (L) having a molecular weight of less than 200 to obtain a slurry;

(2) adding to the slurry obtained in step (1) a mixture (L') of an ether having a molecular weight of less than 200 and a glycol having a molecular weight of less than 200; and (3) subjecting the resulting slurry mixture obtained in step (2) to filtration or centrifugation to separate a solid form of the catalyst therefrom.

DETAILED DESCRIPTION OF THE INVENTION

The double metal cyanide catalyst according to the present invention comprises an ether having a molecular weight of less than 200 and a glycol ligand having a molecular weight of less than 200, instead of an alcohol-based complexing agent conventionally used.

Examples of the ether, as a first complexing agent L of the above formula (I), which has a molecular weight of less than 200 include diethylene glycol dimethyl ether, ethylene glycol dimethyl ether, ethylene glycol monomethyl ether, propylene glycol propyl ether, propylene glycol methyl ether, and a mixture thereof.

A second complexing agent L' of the above formula (I) is a mixture of an ether having a molecular weight of less than 200 (e.g., diethylene glycol dimethyl ether, ethylene glycol dimethyl ether, or ethylene glycol monomethyl ether) and a glycol having a molecular weight of less than 200 (e.g., propylene glycol, dipropylene glycol, tripropylene glycol, ethylene glycol, or diethylene glycol). The ether-glycol mixture (L') controls the reactivity of the catalyst, as well as the unsaturation degree of the polyol product.

The ether-glycol mixture (L') may preferably comprise the ether and glycol in a weight ratio of 1:9 to 9:1, more preferably of 9:1.

The double metal cyanide catalyst of the present invention may be prepared by (1) mixing an aqueous metal (M) salt solution, an aqueous metal (M') cyanide solution, and an ether as a first complexing agent (L) having a molecular weight of less than 200 to obtain a slurry; (2) adding to the slurry obtained in step (1) a mixture of ether and a glycol as a second complexing agent (L'), in which the ether has a molecular weight of less than 200 and the glycol has a molecular weight of less than 200; and (3) subjecting the mixture obtained in step (2) to filtration or centrifugation to separate a solid form of the catalyst therefrom.

The metal salt has the general formula of $M(X)_n$, wherein M is a metal element selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III); X is an anion selected from the group consisting of halogenide, hydroxide, sulfate, carbonate, cyanate, oxalate, thiocyanate, isocyanate, isothiocyanate, carboxylate, and nitrate; and n is an atomic valence of the metal which is selected from 1, 2 and 3.

Examples of the metal salt which may be used in the present invention include zinc chloride, zinc bromide, zinc acetate, zinc acetonylacetonate, zinc benzoate, zinc nitrate, ferrous(II) bromide, cobalt(II) chloride, cobalt(II) thiocyanide, nickel(II) formate, and nickel(II) nitrate, among them, zinc chloride being preferred.

The metal cyanide has the general formula of $(Y)_a M'(CN)_b (A)_c$, wherein Y is an alkali or alkaline metal, M' is a metal element selected from the group consisting of Fe(II), Fe(III), Co(II), Co(III), Cr(II), Cr(III), Mn(II), Mn(III), Ir(III), Ni(II), Rh(III), Ru(II), V(V), and V(IV); A is an ion selected from the group consisting of halogenide, hydroxide, sulfate, carbonate, cyanate, oxalate, thiocyanate, isocyanate, isothiocyanate, carboxylate, and nitrate; a and b are each independently an integer greater than 1; and the sum of a, b and c is equal to the charge of M'.

Examples of the metal cyanide which may be used in the present invention include potassium hexacyanocobaltate(III), potassium hexacyanoferrate(II), potassium hexacyanoferrate (III), calcium hexacyanocobaltate(II), lithium hexacyanoferrate(II), zinc hexacyanocobaltate(II), zinc hexacyanoferrate (III), nickel hexacyanoferrate(II), and cobalt hexacyanocobaltate(III), among them, potassium hexacyanocobaltate(III) being preferred.

The ether as a first complexing agent (L) may be used in an amount ranging from 10 to 90 wt %, preferably 10 to 80 wt %, and the ether-glycol mixture as a second cocomplexing agent (L') may be used in an amount ranging from 0.1 to 20 wt %, preferably 1 to 10 wt %, based on the total weight of the used materials.

Also, in step (2), a milling using ceramic balls may be performed for the purpose of uniform mixing (mill volume 500 L, 5 balls having the diameter of 2.3 cm and 10 balls having the diameter of 1.3 cm).

If necessary, the solid catalyst isolated in step (3) may be further subjected to purification. For example, the solid catalyst may be washed with an aqueous solution containing 60 to 80 wt % of an organic complexing agent such as propylene glycol methyl ether, subjected to filtration or centrifugation, further washed with an aqueous solution containing 80 to 95 wt % of an organic complexing agent, and dried at a temperature of 40 to 90° C. under a 600 to 800 mmHg vacuum until the weight of the catalyst remains constant.

The catalyst thus obtained has a properly controlled reactivity as compared with the prior catalysts, thereby being capable of producing a polyol having an unsaturation degree of 0.015 meq/g or higher, preferably 0.02 to 0.05 meq/g. The polyol having such a unsaturation degree can be directly replaced with the polyol widely used in the preparation of polyurethane foams, and it can form sufficient open-cells to prevent the shrinkage of polyurethane foams, which allows the preparation of polyurethane foams having good properties.

Also, the inventive catalyst having a properly controlled reactivity can be used in a conventional reactor for preparing a polyol, in contrast with the prior DMC catalysts which need a specially designed reactor for controlling an initial reaction temperature due to their high reactivity and an initial and sudden exothermic reaction.

Accordingly, the inventive double metal cyanide catalyst can be effectively used in the preparation of a polyol by the homo-polymerization of propylene oxide (PO) as well as the random copolymerization of propylene oxide (PO) and ethylene oxide (EO). Particularly, the inventive catalyst is suitable for preparing a random PO/EO polyol having 2 to 6OH functional groups per one molecule, a molecular weight of 1,000 to 10,000, and a PO and EO weight ratio of 9.5:0.5~8:2.

The following Examples and Comparative Examples are given for the purpose of illustration only, and are not intended to limit the scope of the invention.

<Preparation of Double Metal Cyanide Catalyst>

Example 1

63 g of an aqueous solution of zinc chloride (50%), 78 g of distilled water and 22 g of ethylene glycol monomethyl ether were mixed to obtain "Solution 1." Separately, 2 g of potassium hexacyanocobaltate(III) was dissolved in 42 g of distilled water to obtain "Solution 2." "Solution 2" was added to "Solution 1" at 50° C. over 1 hour while stirring, and the mixture was further stirred for 1 hour to form a slurry.

Subsequently, a mixture of 80 g of ethylene glycol monomethyl ether and 8 g of propylene glycol was added to the slurry. The resulting slurry was subjected to high speed centrifugation to isolate the solid catalyst component, which was then added to a mixture of 100 g of ethylene glycol monomethyl ether and 40 g of distilled water to obtain another slurry. The slurry was stirred for 1 hour and then subjected to high speed centrifugation to obtain a solid. A mixture of 130 g of ethylene glycol monomethyl ether and 10 g of distilled water was added to the resulting solid to form yet another slurry, the resulting slurry was stirred for 1 hour, filtered to obtain a solid and the solid was dried at 60° C. under a reduced pressure of 762 mmHg until the weight thereof remained constant, to obtain a double metal cyanide catalyst.

Example 2

The procedure of Example 1 was repeated except that a mixture of ethylene glycol monomethyl ether and propylene glycol methyl ether (1:1) was used in place of ethylene glycol monomethyl ether, to obtain a double metal cyanide catalyst.

Comparative Example 1

63 g of an aqueous zinc chloride solution (50%), 78 g of distilled water and 22 g of ethylene glycol monomethyl ether were mixed to obtain "Solution 1." Separately, 2 g of potassium hexacyanocobaltate(III) was dissolved in 42 g of distilled water to obtain "Solution 2." "Solution 2" was added to "Solution 1" at 50° C. over 1 hour while stirring, and the mixture was further stirred for 1 hour to form a slurry.

Subsequently, 80 g of ethylene glycol monomethyl ether was added to the slurry. The resulting slurry was subjected to high speed centrifugation to isolate the solid catalyst component, which was then added to a mixture of 100 g of ethylene glycol monomethyl ether and 40 g of distilled water to obtain another slurry. The slurry was stirred for 1 hour and then subjected to high speed centrifugation to obtain a solid. A mixture of 130 g of ethylene glycol monomethyl ether and 10 g of distilled water was added to the resulting solid to form yet another slurry, the resulting slurry was stirred for 1 hour, filtered to obtain a solid and the solid was dried at 60° C. under a reduced pressure of 762 mmHg until the weight thereof remained constant, to obtain a double metal cyanide catalyst.

Comparative Example 2

The procedure of Comparative Example 1 was repeated except that diethylene glycol dimethyl ether was used in place of ethylene glycol monomethyl ether, to obtain a double metal cyanide catalyst.

Comparative Example 3

The procedure of Comparative Example 1 was repeated except that propylene glycol propyl ether was used in place of ethylene glycol monomethyl ether, to obtain a double metal cyanide catalyst.

Comparative Example 4

The procedure of Comparative Example 1 was repeated except that propylene glycol methyl ether was used in place of ethylene glycol monomethyl ether, to obtain a double metal cyanide catalyst.

Comparative Example 5

The procedure of Comparative Example 1 was repeated except that ethylene glycol was used in place of ethylene glycol monomethyl ether, to obtain a double metal cyanide catalyst.

Comparative Example 6

The procedure of Example 1 was repeated except that propylene glycol was used in place of ethylene glycol monomethyl ether, to obtain a double metal cyanide catalyst.

Comparative Example 7

The procedure of Example 1 was repeated except that tert-butyl alcohol and polyether polyol were used in place of ethylene glycol monomethyl ether and propylene glycol, respectively, to obtain a double metal cyanide catalyst.

<Preparation of PO/EO Random Polyol>

A 4 L high pressure reactor was charged with 523 g of glycerol propoxylate (MW 550) as a starter polyol and 0.21 g of each of the catalysts obtained in Examples 1 and 2 and Comparative Examples 1 to 7, and the mixture was stirred at 115° C. under a vacuum. 150 g of a mixture of propylene oxide (PO) monomer and ethylene oxide (EO) monomer (9:1) was added to the resulting mixture, and the pressure of the reactor was allowed to rise to 4 psig due to the progress of the polymerization reaction. Then, 2177 g of a mixture of PO and EO (9:1) was introduced at a rate of 8 g/min to the reactor maintained to 115° C., and when the reactor pressure became constant, the reaction mixture was kept under the condition of 115° C. in vacuo to remove unreacted monomers, to obtain a PO/EO random polyol.

The properties of the random polyols thus prepared were evaluated, and the results are shown in Table 1.

TABLE 1

| Catalyst | Reactivity* | OH value (KOH mg/g) | Degree of unsaturation (meq/g) | Viscosity (25° C., cps) | EO Content** (wt %) |
|---|---|---|---|---|---|
| Com. Ex. 1 | Δ | — | — | — | — |
| Com. Ex. 2 | Δ | — | — | — | — |
| Com. Ex. 3 | Δ | — | — | — | — |
| Com. Ex. 4 | Δ | — | — | — | — |
| Com. Ex. 5 | X | — | — | — | — |
| Com. Ex. 6 | X | — | — | — | — |
| Example 1 | ○ | 56.3 | 0.023 | 600 | 8.3 |
| Example 2 | ○ | 56.1 | 0.021 | 570 | 8.5 |
| Com. Ex. 7 | ◉ | 56.0 | 0.005 | 580 | 8.4 |

*◉: The reactivity of the catalyst is too high for controlling the initial exothermic reaction.
○: The reactivity of the catalyst is capable of controlling the initial exothermic reaction.
Δ: The reactivity of the catalyst is too low to complete the reaction.
X: No reaction
**EO content was measured in accordance with ASTM D2849.

As shown in Table 1, the catalysts of Examples 1 and 2 according to the present invention showed an appropriate reactivity, thereby producing polyols having a suitable level of unsaturation degree and an OH value of 55 to 57 (KOH mg/g). This OH value means the presence of about 30H functional groups per molecule, i.e. the polyol prepared is a polyether polyol having a molecular weight of about 3,000.

In contrast, each of the catalysts containing only an ether as both a first complexing agent L and a second complexing agent L', which were prepared in Comparative Examples 1 to 4, showed a low reactivity and thus failed to complete the reaction for producing a polyol. Each of the catalysts containing only a glycol, as a first complexing agent L and as a second complexing agent L', prepared in Comparative Examples 5 and 6 showed no activity. The ethers and glycols used in Comparative Examples 1-6 have MW of less than 200. Meanwhile, the catalyst of Comparative Example 7 showed too high an activity to control the reaction temperature and leads to a polyol having a very low unsaturation degree of 0.005 meq/g which is not adequate for substituting the conventional polyol widely used.

<Preparation of Polyurethane Slab Foam>

The PO/EO random polyols thus obtained were used to prepare polyurethane foams in accordance with a conventional method. The ingredients used in the preparation of the polyurethane foams and the properties thereof are shown in Table 2. For comparison, the properties of the foam prepared from the random polyol produced using the conventional catalyst, KOH, are also shown in Table 2.

TABLE 2

| | Catalyst used in the preparation of polyol | | |
|---|---|---|---|
| | KOH catalyst | Catalyst of Ex. 2 | Catalyst of Com. Ex. 7 |
| Ingredients of Polyurethane foam | | | |
| Polyol | 100 | 100 | 100 |
| Water | 3.3 | 3.3 | 3.3 |
| Amine catalyst, A-1/D33LV | 0.15 | 0.15 | 0.15 |
| Silicon, L-580 | 1.0 | 1.0 | 1.0 |

TABLE 2-continued

| | Catalyst used in the preparation of polyol | | |
|---|---|---|---|
| | KOH cataylst | Catalyst of Ex. 2 | Catalyst of Com. Ex. 7 |
| Tin catalyst, T-9 | 0.15 | 0.15 | 0.15 |
| TDI-80 | 44.69 | 44.69 | 44.69 |
| Properties of Polyurethane foam | | | |
| 25% ILD (kg/314 cm$^2$) | 19.3 | 19.2 | 21.5 |
| 60% ILD (kg/314 cm$^2$) | 40.8 | 41.5 | 45.7 |
| Tear Strength | 0.52 | 0.56 | 0.42 |
| Tensile Strength | 0.94 | 0.97 | 0.96 |
| Elongation (%) | 118 | 125 | 107 |
| Breathability | 0.97 | 1.06 | 0.68 |

As can be seen from Table 2, the polyurethane foam prepared from the polyol produced using the catalyst of Example 2 is much more excellent, in terms of elongation and breathability, than the foams prepared through the use of the KOH catalyst as well as the catalyst of Comparative Example 7.

While the invention has been described with respect to the above specific embodiments, it should be recognized that various modifications and changes may be made to the invention by those skilled in the art which also fall within the scope of the invention as defined by the appended claims.

What is claimed is:

1. A double metal cyanide catalyst, represented by formula (I):

$$M_a[M'(CN)_6]_b L_c L'_d \quad (I)$$

wherein,
M is a metal element selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III);
M' is a metal element selected from the group consisting of Fe(II), Fe(III), Co(II), Co(III), Cr(II), Cr(III), Mn(II), Mn(III), Ir(III), Ni(II), Rh(III), Ru(II), V(V), and V(IV);
L is a first complexing agent, said first complexing agent being an ether having a molecular weight of less than 200;
L' is a second complexing agent, said second complexing agent being a mixture of an ether having a molecular weight of less than 200 and a glycol having a molecular weight of less than 200; and
a, b, c and d are each independently an integer, the sum of which is equal to the sum of the charges of M and M',
wherein the glycol is selected from the group consisting of propylene glycol, dipropylene glycol, tripropylene glycol, ethylene glycol, diethylene glycol, and a mixture thereof.

2. The double metal cyanide catalyst of claim 1, wherein the ether is selected from the group consisting of diethylene glycol dimethyl ether, ethylene glycol dimethyl ether, ethylene glycol monomethyl ether, propylene glycol propyl ether, propylene glycol methyl ether, and a mixture thereof.

3. The double metal cyanide catalyst of claim 1, wherein the second complexing agent L' comprises the ether and the glycol in a weight ratio of 1:9 to 9:1.

4. A method for preparing the double metal cyanide catalyst of claim 1, which comprises:
(1) mixing an aqueous metal (M) salt solution, an aqueous metal (M') cyanide solution, and a first complexing agent (L), said first complexing agent being an ether having a molecular weight of less than 200 to obtain a slurry;
(2) adding to the slurry obtained in step (1) a second cocomplexing agent (L') composed of an ether having a molecular weight of less than 200 and a glycol having a molecular weight of less than 200, wherein the glycol is selected from the group consisting of propylene glycol, dipropylene glycol, tripropylene glycol, ethylene glycol, diethylene glycol, and a mixture thereof; and
(3) subjecting the resulting slurry mixture obtained in step (2) to filtration or centrifugation to separate a solid form of the double metal cyanide catalyst.

5. The method of claim 4, wherein, in step (1), the first complexing agent L is used in an amount ranging from 10 to 90 wt % based on the total weight of the used materials.

6. The method of claim 4, wherein, in step (2), the second complexing agent L' is used in an amount ranging from 0.1 to 20 wt % based on the total weight of the used materials.

7. The method of claim 4, wherein the isolated solid double metal cyanide catalyst in step (3) is further subjected to washing with an aqueous alcohol.

8. A method for preparing a polyol comprising subjecting a propylene oxide to homo polymerization in the presence of a double metal cyanide catalyst or subjecting a propylene oxide and an ethylene oxide to a random copolymerization in the presence of a double metal cyanide catalyst, wherein the double metal cyanide catalyst is the of the double metal cyanide catalyst of claim 1.

9. The method of claim 8, wherein the random copolymerization of the propylene oxide and the ethylene oxide employs the propylene oxide and the ethylene oxide in a weight ratio of 9.5:0.5-8:2.

* * * * *